Feb. 4, 1969 S. C. TABISZ 3,426,347

PARALLEL GRAY TO BINARY CONVERTER WITH AMBIGUITY CHECK BETWEEN TWO ENCODERS

Filed Nov. 24, 1965 Sheet 1 of 2

Sylvester C. Tabisz,
INVENTOR.

BY Harry M. Saragovitz
Edward J. Kelly
Herbert Berl
Robert C. Sims

| | COARSE WORD | | | | FINE WORD | | |
|---|---|---|---|---|---|---|---|
| | MSB FF17 | FF16 | FF15 | LSB FF14 | MSB FF13 | FF12 - - - - - LSB FF1 | |
| CASE 1: | 0 | 1 | 0 | 1 | 1 | 0 | GRAY WORD |
| | 0 | 1 | 1 | 0 | 1 | 1 | BINARY WORD |
| | | | | 1 | | | ADD "1" |
| | 0 | 1 | 1 | 1 | 1 | 1 | CORRECTED BINARY WORD |
| CASE 2: | 0 | 1 | 1 | 1 | 1 | 0 | GRAY WORD |
| | 0 | 1 | 0 | 1 | 1 | 1 | BINARY |
| CASE 3: | 0 | 1 | 0 | 1 | 0 | 1 | GRAY |
| | 0 | 1 | 1 | 0 | 0 | 1 | BINARY |
| CASE 4: | 0 | 1 | 1 | 1 | 0 | 1 | GRAY |
| | 0 | 1 | 0 | 1 | 0 | 1 | BINARY |
| | | | | 1 | | | ADD "1" TO LSB OF COARSE |
| | 0 | 1 | 1 | 0 | 0 | 1 | CORRECTED BINARY |

FIG. 2

Sylvester C. Tabisz,
INVENTOR.
Harry M. Saragovitz
BY Edward J. Kelly
Herbert Berl
Robert C. Sims United States Patent Office 3,426,347

Patented Feb. 4, 1969

3,426,347

PARALLEL GRAY TO BINARY CONVERTER WITH AMBIGUITY CHECK BETWEEN TWO ENCODERS

Sylvester C. Tabisz, Baltimore, Md., assignor, by mesne assignments, to the United States of America as represented by the Secretary of the Army Filed Nov. 24, 1965, Ser. No. 510,163
U.S. Cl. 340—347 10 Claims
Int. Cl. H04l *3/00;* H03k *13/00;* G06f *11/00*

This invention relates to a system for converting a Gray or Reflected Binary Code to a Binary Code while correcting for ambiguities between two encoders producing the Gray Code signals. This system allows the operations to take place in parallel.

The feature of shaft position-to-number converters which controls their forms, complexity, and utilizability is the carry ambiguities. Each time that there is a shift in the value of any digit other than the least significant one, there is also a change in the least significant digit if its code is that of a radix-number system. If special care is not taken, it will be possible to sample this output during this carry time and give an erroneous answer. Therefore, the use of the Gray Code which is a cyclic code has great utility. It has a form such that at any given time, at most, only one bit is changing. However, when two Gray Code shaft encoders are common to the same gearing assembly, means has to be provided for alignment such that no ambiguity exists. This is not possible in all cases as at particular positions ambiguity does exist between the two encoders.

It is, therefore, an object of the present invention to eliminate ambiguities between two encoders.

A further object of this invention is to provide a parallel Gray to Binary converter having ambiguity check between two encoders.

A still further object of the invention is to perform ambiguity correction between two encoders in parallel.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

FIGURE 2 shows a truth table for ambiguity correction.

Figure 1:
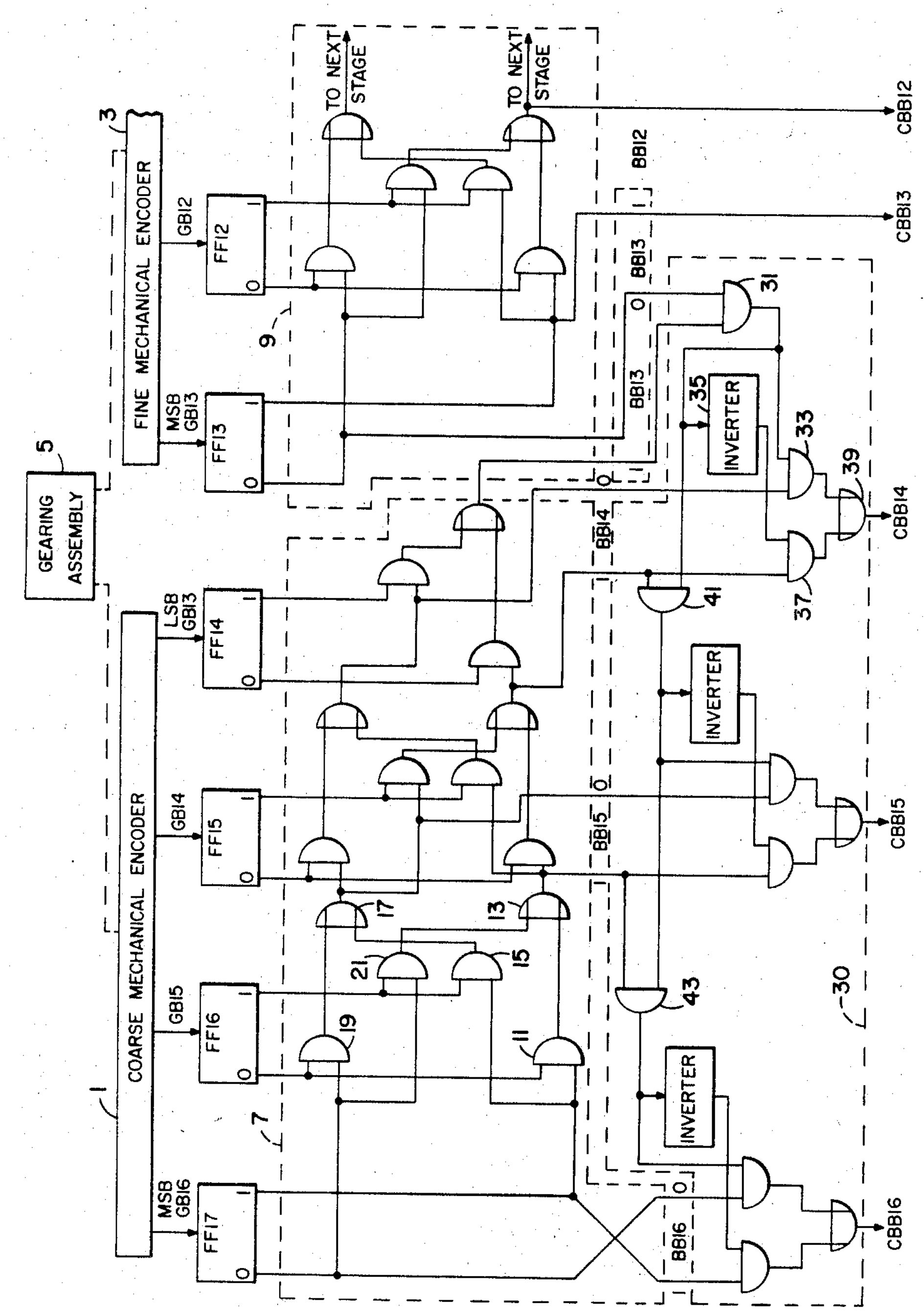
FIGURE 1 shows a logic diagram in accordance with the present invention.

FIGURE 1 shows two Gray shaft encoders 1 and 3 which are common to the same gearing assembly 5. Encoder 1 is of the mechanical type for coarse positioning. The other encoder 3, is of the optical type for fine positioning. Both encoders are reading the same units and represent a single computer or information word. For one complete revolution of optical encoder 3, mechanical encoder 1 will advance by one Gray Code bit. Therefore, the most significant bit (MSB) of the optical encoder must represent the same value as the least significant bit (LSB) of the mechanical encoder in the word. This is not to say that if Gray bit 13 (GB 13) of encoder 1 is a "1," the GB 13 of encoder 3 must also be a "1," but that if the conversion of the LSB of encoder 1 to the Binary Code is a "1," then the MSB of encoder 3 must be a "1." At particular positions ambiguity does exist between the two encoders.

The principal use of the Gray Code is in the conversion of analog information to digital information. The conversion of Gray to Binary may be stated by three simple guides:

(1) Write down the MSB in the conversion of Gray to Binary as the first Binary bit.

(2) If the next Gray bit is a "0," the previous Binary bit is repeated.

(3) If the next Gray bit is a "1," then the previous Binary bit is complemented.

The invention as illustrated in FIGURE 1 provides two converters 7 and 9 for performing the conversion of the Gray Bits (GB) to Binary Bits (BB). The Gray Code information from the encoders is dumped into the flip-flop registers FF 1–17 in parallel. As soon as any of the flip-flop registers are set, the Gray to Binary conversion starts to take place. In accordance with the above rules of conversion, the MSB of each encoder (the outputs of flip-flop 17 and flip-flop 13) is used directly as the first Binary Bit (BB 16 and BB 13). Assume that GB 16 is a "1," then BB 16 will also be a "1." If GB 15 is a "0," then the BB 15 should be a "1." The converter 7 provides a "1" output due to the fact that both the inputs of the AND gate 11 are energized and the output of AND gate 11 goes through OR gate 13 to the "1" side of BB 15 at the output of the converter. However, if GB 15 is a "1" then BB 15 should be a "0." This is accomplished in the same manner by AND gate 15 and OR gate 17. Now, assume that GB 16 is a "0," then BB 16 will also be a "0." Now, if GB 15 is a "0," then the BB 15 should be a "0." Converter 7 provides a "0" output due to the fact that both the inputs of the AND gate 19 are energized and output of AND gate 19 goes through OR gate 17 to the "0" side of BB 15. However, if GB 15 is a "1" then BB 15 should be a "1." The converter accomplishes this in the same manner by AND gate 21 and OR gate 13.

It can easily be seen that the conversion of GB 14 will operate in the same manner because of the connections from the OR gates 13 and 17. The Gray Code information from the optical encoders has a separate converter 9 which operates in the same manner as converter 7, except that the "0" BB is not read out. The converters 7 and 9, therefore, give the Binary Bits BB 1–16 with two BB 13's. BB 1–11 are not shown as they are just a repeat of the circuits to BB 12. The BB 13 of the coarse mechanical encoder has circuits only for the "1" side for reasons to be explained later.

The ambiguity correction is performed by the logic system 30. The correction is applied only to the output of the mechanical encoder as the optical encoder is most likely to be correct. This is why the "0" BB of the optical encoder are not read out.

The functions that must be performed by logic system 30 is indicated by Truth Table of FIGURE 1. In each case where the BB 13 from the mechanical encoder does not agree with the BB 13 from the optical encoder, a "1" is added to the BB 13 of the mechanical encoder. However, since the corrected BB 13 (CBB 13) is always taken from the optical encoder, there is no need to add a "1" to BB 13 of the mechanical unless doing so would cause a carry to BB 14. This, of course, only can happen when BB 13 of encoder 1 is a "1" (case 4 of the table). Therefore, there is no need for an output of the "0" of BB 13 of encoder 1. Case 1 of the table illustrates this. It can also be seen from the tables that when the BB 13 of the optical encoder is a "1" then a carry to BB 14 is not possible, because if BB 13 of the mechanical encoder is a "1" then it agrees with the optical encoder; therefore, no change is called for (see case 1 of the table). From all this it can be seen that logic system 30 need not sense the "0" output of BB 13 of encoder 1 or sense the "1" output of BB 13 of the encoder 3, and the only condition which cause a carry to BB 14 will be when BB 13 of encoder 1 is a "1" and BB 13 of encoder 3 is a "0" (see case 4 of the table).

Logic system 30 has an AND gate 31 having as its inputs the "1" output of the BB 13 of encoder 1 and the "0" output of the BB 13 of encoder 3; therefore, AND gate 31 will only have an output when it is desired for a carry to BB 14. When there is no output from gate 31, there can be no output of AND gate 33, even if BB 14 is a "0." However, due to the inverter 35, AND gate 37 will have an output when BB 14 is a "1." This will provide an output at CBB 14 by way of OR gate 39. If there is no output from gate 31, then there also can be no output from AND gate 41. An output from gate 31 will allow gate 33 to have an output when BB 14 is a "0," but will not allow gate 37 to have an output if BB 14 is a "1." This, therefore, adds a "1" to BB 14 to form CBB 14. If BB 14 was a "1" then a carry to BB 15 must take place. This is accomplished by gate 41 which will have an output due to its connections to gate 31 and the "1" side of BB 14. The other stages, BB 15 and BB 16, will operate in the same manner with AND gate 41 taking the place of gate 31 for BB 15 and AND gate 43 taking the place of gate 31 for BB 16.

The ambiguity correction is performed in parallel, and the results are gotten in a very short time. This time is limited only by the speed of the logic circuits.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art that changes may be made in the form of the apparatus disclosed without departing from the spirit of the invention as set forth in the disclosure, and that in some cases certain features of the invention may sometimes be used to advantages without a corresponding use of other features. It is, therefore, to be understood that within the scope of the appended claims the invention may be practiced otherwise that as specifically described. Accordingly, it is desired that the scope of the invention be limited only by the appended claims.

I claim:

1. A logic system comprising: first and second means each having outputs which represent an information word, said first means having a least significant output which in a normal state will represent the same information as that represented by a most significant output of said second means; correction means connected to the outputs of said first means and to the most significant output of said second means, and said correction means being so constructed as to generate a carry to the information of the least significant output of the first means when the most significant output of the second means represents different information from that of the least significant output of said first means.

2. A logic system as set forth in claim 1, wherein said first and second means are encoders.

3. A logic system as set forth in claim 1, wherein said first and second means have outputs which are bits representative of a Binary Code.

4. A logic system as set forth in claim 3, wherein said correction means comprises: a first AND gate having a first input connected to a "1" output of the least significant bit of said first means and a second input connected to a "0" output of the most significant bit of said second means; a carry network connected to all bits of said first means except the least significant bit; and connections from the output of said AND gate to an input of said carry network whereby a carry will be generated when the least significant bit of said first means is a "1" at the same time the most significant bit of said second means is a "0."

5. A logic system as set forth in claim 4, wherein said first and second means are encoders.

6. A logic system as set forth in claim 5, wherein said first and second means further have converter means connected to the outputs of each encoder whereby said outputs can be converted into the Binary Code.

7. A logic system as set forth in claim 3, wherein said correction means comprises: a plurality of units individually associated with the outputs of said first means except the least significant output; each unit having first and second AND gates, said first AND gate of each unit having a first input connected to a "0" side of its unit's associated output of said first means, each of said second AND gates having a first input connected to a "1" side of its associated output of said first means, each unit having a third AND gate which has an output connected to a second input of the first AND gate, the output of said third AND gate further being connected by way of an inverter to a second input of said second AND gate, each output of said third AND gates, except the one associated with the most significant output of the first means, being connected to an input of the third AND gate of the unit associated with the next higher output of said first means; another input of each unit's third AND gate being connected to the "1" side of an output of said first means which is the next lower output from said units associated output; connection means connecting an input of the third AND gate, which has its other input connected to the "1" side of the least significant output of said first means, to a "0" side of the most significant output of said second means; and a plurality of combining means individually combining the outputs of the first and second AND gates of each unit into a single output for each unit which forms the output of the correction means.

8. A logic system as set forth in claim 7, wherein said combining means are OR gates.

9. A logic system as set forth in claim 8, wherein said first and second means are encoders.

10. A logic system as set forth in claim 9, wherein said first and second means further have converter means connected to the outputs of each encoder whereby said outputs can be converted into the Binary Code.

References Cited

UNITED STATES PATENTS

| | | | |
|---|---|---|---|
| 2,679,644 | 5/1954 | Lippel et al. | 340—347 |
| 2,779,539 | 1/1957 | Darlington | 340—347 |
| 2,986,726 | 5/1961 | Jones | 340—347 |
| 3,188,626 | 6/1965 | Palmer | 340—347 |
| 3,197,764 | 7/1965 | Oddo et al. | 340—347 |
| 3,206,738 | 9/1965 | Wayman | 340—347 |

MAYNARD R. WILBUR, *Primary Examiner.*

W. J. KOPACZ, *Assistant Examiner.*

U.S. Cl. X.R.

235—153